(12) United States Patent
Suessmuth et al.

(10) Patent No.: US 11,966,665 B2
(45) Date of Patent: *Apr. 23, 2024

(54) METHOD FOR DESIGNING A PIECE OF APPAREL IN PARTICULAR FOR DESIGNING AN UPPER OF A SHOE

(71) Applicant: adidas AG, Herzogenaurach (DE)

(72) Inventors: Jochen Bjoern Suessmuth, Erlangen (DE); Jens Raab, Nuremberg (DE); Detlef Philipp Müller, Auerbach (DE)

(73) Assignee: adidas AG, Herzogenaurach (DE)

( * ) Notice: Subject to any disclaimer, the term of this patent is extended or adjusted under 35 U.S.C. 154(b) by 53 days.

This patent is subject to a terminal disclaimer.

(21) Appl. No.: 17/485,699

(22) Filed: Sep. 27, 2021

(65) Prior Publication Data

US 2022/0156414 A1 May 19, 2022

Related U.S. Application Data

(63) Continuation of application No. 16/354,343, filed on Mar. 15, 2019, now Pat. No. 11,132,474.

(30) Foreign Application Priority Data

Mar. 16, 2018 (DE) .................... 10 2018 204 083.4

(51) Int. Cl.
*G06F 30/00* (2020.01)
*A43D 1/08* (2006.01)
(Continued)

(52) U.S. Cl.
CPC .............. *G06F 30/00* (2020.01); *A43D 1/08* (2013.01); *G06F 30/23* (2020.01); *G06Q 50/04* (2013.01); *G06T 17/00* (2013.01); *A43D 2200/60* (2013.01)

(58) Field of Classification Search
CPC ........... G06F 30/00; G06F 30/23; A43D 1/08; A43D 2200/60; G06Q 50/04; G06T 17/00; Y02P 90/30
See application file for complete search history.

(56) References Cited

U.S. PATENT DOCUMENTS

2011/0299762 A1* 12/2011 Marre ..................... G06T 7/97
                                                           382/154
2012/0158369 A1*  6/2012 Bachrach ............. G06T 17/205
                                                           703/1

(Continued)

FOREIGN PATENT DOCUMENTS

EP     2 862 467 A1   4/2015
EP     3 178 342 A1   6/2017

OTHER PUBLICATIONS

Extended European Search Report issued in European Patent Application No. 19163440.1, dated May 13, 2019, 9 pages.

*Primary Examiner* — Santosh R Poudel
(74) *Attorney, Agent, or Firm* — Sterne, Kessler, Goldstein & Fox P.L.L.C.

(57) ABSTRACT

The present invention provides a method for designing of a piece of apparel in particular an upper of a shoe, comprising the steps of providing at least one first panel including a plurality of feature points in an essentially two-dimensional configuration, arranging the at least one first panel on a first reference body in a three-dimensional configuration representing the piece of apparel to be designed, generating a first mapping between the two-dimensional configuration of the at least one first panel and the three-dimensional configuration of the at least one first panel using the plurality of feature points and designing the piece of apparel using the first mapping.

23 Claims, 6 Drawing Sheets

(51) Int. Cl.
*G06F 30/23* (2020.01)
*G06Q 50/04* (2012.01)
*G06T 17/00* (2006.01)

(56) References Cited

U.S. PATENT DOCUMENTS

| | | | |
|---|---|---|---|
| 2013/0124156 A1* | 5/2013 | Wolper | G06T 17/00 |
| | | | 703/1 |
| 2014/0056502 A1 | 2/2014 | Twellmann et al. | |
| 2014/0114620 A1 | 4/2014 | Grinspun et al. | |
| 2014/0277663 A1 | 9/2014 | Gupta et al. | |
| 2014/0362079 A1 | 12/2014 | Regan et al. | |
| 2015/0287242 A1 | 10/2015 | Kim et al. | |
| 2015/0339853 A1* | 11/2015 | Wolper | G06T 17/00 |
| | | | 345/423 |
| 2017/0053335 A1* | 2/2017 | Hanscom | A43D 1/027 |
| 2017/0193696 A1* | 7/2017 | Mazula | G06V 30/418 |
| 2018/0317610 A1* | 11/2018 | Golub | B33Y 70/00 |
| 2019/0026393 A1 | 1/2019 | Barnes et al. | |
| 2019/0108396 A1 | 4/2019 | Dal Mutto et al. | |

\* cited by examiner

Fig. 1

Fig. 2a $f: \mathbb{R}^2 \mapsto \mathbb{R}^3$

METHOD FOR DESIGNING A PIECE OF APPAREL IN PARTICULAR FOR DESIGNING AN UPPER OF A SHOE

CROSS-REFERENCE TO RELATED APPLICATIONS

This application is a continuation of U.S. application Ser. No. 16/354,343, filed Mar. 15, 2019, which claims priority to German Application No. 10 2018 204 083.4, filed Mar. 16, 2018, the disclosures of which are incorporated by reference in their entireties.

TECHNICAL FIELD

The present invention relates to a design method for a piece of apparel, in particular for an upper of a shoe.

TECHNICAL BACKGROUND

Modern manufacturing industries are characterized by a high degree of process integration as well as a globally distributed logistics and process chain. It is common, that research and development as well as product design is performed by a dedicated product design entity, whereas production engineering as well as manufacturing is executed by a separate manufacturing entity that is organizationally (in terms of location, personnel, tooling or supply chain, etc.) different from the product design entity.

A manufacturing entity may have to adapt an initial product design according to certain material and/or manufacturing requirements such as the existing machines and tools, the properties of the material available for manufacturing, the skills and experience of the manufacturing personnel, etc. For example, when manufacturing the first prototype for mass production, the manufacturing entity may realize that certain product characteristics have to be changed.

Figure 1:
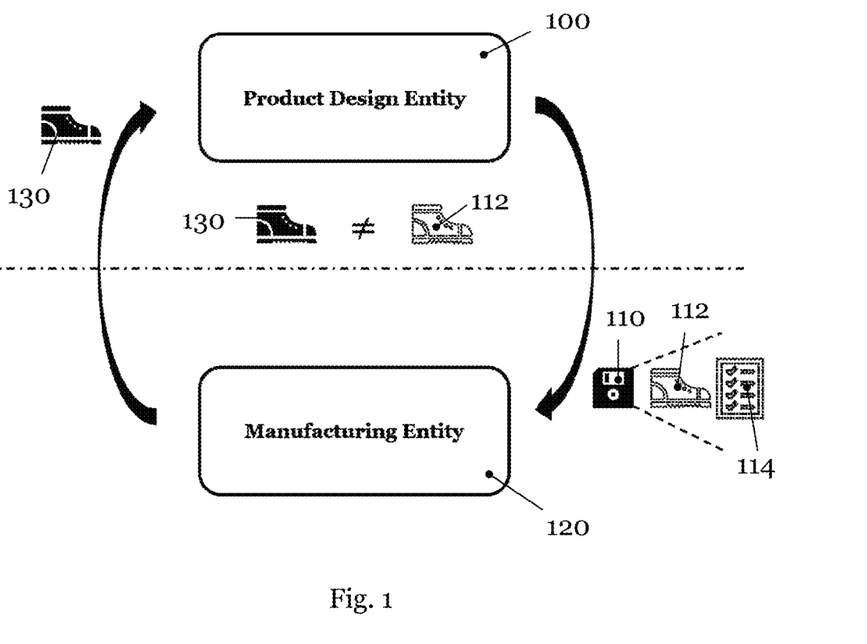
FIG. 1 illustrates a conventional product development process commonly present in the apparel industry.

FIG. 1 illustrates a conventional product development process as it is common for example in the shoe industry. A product design entity 100, for example a shoe company, may generate a new shoe design by employing conventional design techniques (e.g., drawings, schematics, mock-up models, etc.) as well as computer aided design (CAD) techniques known in the art.

When the initial shoe design is completed, the product design entity 100 may transfer initial design information 110 to a manufacturing entity 120, for example a shoe manufacturing factory located in a different location or country. The design information 110 may for example comprise a design model 112 (e.g., a three-dimensional CAD model) of the shoe as well as additional drawings and design instructions 114 such as a list of desired materials to be used for manufacturing and/or requirements for production time, a target production quantity and target production costs, etc.

Upon receiving the design information 110 the manufacturing entity 120 will try to reproduce as close as possible the shape and look of the shoe design as represented by the design model 112, while at the same time implementing the additional design instructions 114. In a next step, the manufacturing entity 120 manufactures a first shoe prototype 130 and sends the prototype 130 back to the product design entity 100 for inspection. Due to various manufacturing constraints and/or changes made during production engineering, the prototype 130 may not always fully represent the design model 112 and/or comply with the additional design instructions 114.

Upon inspection of the shoe prototype 130 the design entity 100 would decide whether the shoe prototype 130 sufficiently reproduces the initial shoe design or whether the shoe design requires modifications. In the latter case the design entity 100 may modify the shoe design and may send updated design information 110 to the manufacturing entity 120 for re-implementation.

The product development cycle discussed above may then be iterated several times until the product design entity 100 is satisfied with the prototype 130 and deems it ready for mass production.

In this redundant product development process, which involves several iterations of prototype manufacturing, the organizational separation and geographical distance between the product design entity and the manufacturing entity can cause significant problems due to slow feedback and insufficient communication.

Consequently, product development will be prone to errors, expensive and slow resulting in a significantly increased time to market, which is often the most relevant performance indicator for modern product development.

It is therefore a need to provide an improved product design and/or prototyping method that overcomes at least partly the above outlined deficiencies.

SUMMARY OF THE INVENTION

For reasons of clarity, the various embodiments of the invention are described in the following with reference to a design process for an upper of a shoe. It should be noted however, that the methods provided by the present invention are applicable to various design processes of any kind of apparel and/or cut-and-stitched article.

In some embodiments, the present invention provides a method for designing a piece of apparel, in particular an upper of a shoe, comprising: providing at least one first panel including a plurality of feature points in an essentially two-dimensional (2D) configuration, arranging the at least one first panel on a first reference body in a three-dimensional (3D) configuration representing the piece of apparel to be designed, generating a first mapping between the 2D configuration of the at least one first panel and the 3D configuration of the at least one first panel using the plurality of feature points, and designing the piece of apparel using the first mapping.

In this respect and for the remainder of the application, the term "essentially" shall be defined as "within typical manufacturing, computation and/or design tolerances." Moreover, the term "generating" should be construed broadly, such that "generating" may also comprise "creating", "obtaining", "deriving", etc.

The above embodiment allows realistically incorporating the effect of arranging the at least one first panel on the reference body into the design process. For example, the deformation of the at least one first panel caused by stretch and shear during arrangement on the reference body as well as effects of joining a first section and a second section of the at least one first panel can be incorporated into the design process and thus reflected during product development. In this way potential discrepancies between the initial product design and the prototype of the piece of apparel can be significantly reduced. As a consequence, the number of consecutive prototypes required during product development may be lower and product development cycles may thus be accelerated.

Further, the step of providing the at least one first panel and arranging it on a reference body may involve manufacture and physical manipulation of the at least one first panel.

For instance, due to non-linear and anisotropic material properties it may be very difficult to numerically simulate the effects of arranging the at least one first panel on the reference body. Instead, it may be more practical to capture such effects via a physical mock up model of the piece of apparel, for example, using a dummy shoe upper or last shell arranged on a reference shoe last.

Further, generating the first mapping may involve a 3D scanning technique such as photogrammetry and/or 3D laser scanning.

For instance, by using such techniques the material dependent deformation effects caused by joining, shear and/or stress of the at least one first panel can reliably be determined and/or reflected in the design process for a given reference body and choice of panel material without the need for performing complex computer simulations.

Further, the provided methods may comprise generating a first 3D reference model of the piece of apparel based on the at least one first panel in the 3D configuration and/or generating a 2D reference model of the at least one first panel in the 2D configuration.

The above 3D and 2D reference models may be implemented by an electronic data processing system such as a CAD software operated on a computer. In particular, said 2D and 3D reference models may be used to obtain the above first mapping between the 2D configuration and the 3D configuration of the at least one first panel.

Further, the plurality of feature points may be configured to allow a unique identification of the position of each feature point.

In particular, the plurality of feature points may be configured to allow a unique identification of the position of each feature point with respect to one or more of all other feature points, a common reference point and/or a common coordinate system.

Consequently, the feature points represented in both the 3D and the 2D reference model may be used to generate a one-to-one correspondence (i.e., the first mapping) between the 2D reference model and the 3D reference model. For instance, the deformation of the at least one first panel can be determined by determining the changes in the relative position and/or the relative angles between the feature points.

In some embodiments, the provided methods may comprise generating a manufacturing template for the piece of apparel, wherein the manufacturing template meets manufacturing requirements for the piece of apparel.

For instance, the manufacturing template may meet various manufacturing requirements such as the type of material and the corresponding material properties (e.g., thickness, surface texture, deformation properties, etc.), the type of joining technique (e.g., gluing, stitching, welding etc.) and/or the type of manufacturing machines and tools that are used for manufacturing the piece of apparel. Moreover, the manufacturing template may incorporate the individual manufacturing knowhow of the production engineer.

Further, the provided methods may comprise generating a second mapping between the manufacturing template and the 2D reference model of the at least one first panel. Moreover, a third mapping between the 3D reference model and the manufacturing template can be generated, wherein the third mapping is based on the first mapping and the second mapping.

In this way, an accurate correspondence between the manufacturing template and the 2D and/or the 3D reference model can be established. Thus, by using the second and/or the third mapping, deviations of the manufacturing template from the original shoe design due to the various manufacturing requirements can be directly transferred and visualized on the 2D and/or 3D reference model of the piece of apparel.

For instance, the third mapping allows for translating changes made by the product designer to the 3D reference model directly to the manufacturing template and vice versa, without the need to involve the production engineer. Thus, the need for manufacturing of prototypes and for shipping said prototypes from the manufacturing entity to the product design entity may be reduced.

Further, embodiments of the present invention may comprise manufacturing at least one second panel based on the manufacturing template in an essentially 2D configuration.

Further, the embodiments may comprise arranging the at least one second panel on a second reference body having essentially the same shape as the first reference body in a 3D configuration.

Further, the embodiments may comprise generating a second 3D reference model of the piece of apparel based on the at least one second panel in the 3D configuration.

Moreover, a fourth mapping between the first 3D reference model and the second 3D reference model may be generated.

For example, the second 3D reference model may be generated by methods similar to the methods used for generating the first 3D reference model of the piece of apparel, e.g., by a 3D scanning technique such as photogrammetry and/or 3D laser scanning.

The fourth mapping therefore allows for establishing an accurate correspondence between the at least one first panel and the at least one second panel not only for the 2D configuration (i.e., between the 2D reference model and the manufacturing template), but also for the 3D configuration (i.e., between the first and the second 3D reference models of the piece of apparel).

Thus, changes due to different deformation properties of the at least one first panel and the at least one second panel can be incorporated into the product development process for the piece of apparel. This may be particularly relevant if the at least one first panel comprises a first material and the at least one second panel comprises a second material, wherein the first material is different from the second material.

For example, if the material properties of the first and second panels such as thickness, surface texture and/or deformation behavior differ from each other, the above embodiments enhance the accuracy of the resulting correspondence between the 3D reference models of the piece of apparel and the actual piece of apparel to be manufactured.

Further, generating one or more of the first, the second, the third and the fourth mapping may involve a deformation algorithm such as a finite element method and/or the deformation of a polygon mesh.

Further, one or more of the first, the second, the third and the fourth mapping may be essentially bijective and/or essentially true to scale.

For example, it is then possible to translate modifications made to any of the reference models or the manufacturing template directly back and forth to any of the other reference models or the manufacturing template.

Further, the 3D and/or the 2D reference models as well as the manufacturing template may be editable CAD models.

For instance, a designer may modify an already existing design for a piece of apparel or create a new design on the level of the 2D reference model. The above mappings then allow for obtaining and visualizing the design modifications on the level of the corresponding 3D or 2D reference models as well as the manufacturing template and vice versa.

Moreover, the above mappings only needs to be determined once for a given choice of reference body and panel materials. After the mappings are determined they can be used for many consequent design iterations and/or for creating many different designs based on the same size and shape of the reference body.

Further, the provided methods may comprise iteratively designing the piece of apparel using one or more of the first, the second, the third and the fourth mapping.

In this way the product development process for the piece of apparel is significantly improved and accelerated since the workload of the production engineer may be reduced and since the 3D reference models of the piece of apparel may comprise an accurate representation of the actual piece of apparel that is be manufactured.

Thus, development cycles may be shorter and the time and efforts needed for adapting an initial product design for mass production may be reduced significantly.

For instance, if the product designer has access to a rapid prototyping facility, the product designer may easily check the effect of design changes to the piece of apparel without the need to involve the production engineer or even the complete manufacturing entity for every design modification.

In principle, the above embodiments also enable manufacturing of individualized pieces of apparel according to customer requirements. For example, a product designer may adapt the original product design according to customer preferences and directly translate these modifications to a modified manufacturing template which may be readily manufactured without the need to involve the production engineer. Evidently, said aspects of the invention may be very useful for automated manufacturing facilities.

Further, a method for integrated design and manufacture of a piece of apparel is provided, wherein the method comprises iteratively designing the piece of apparel using one or more of the first, the second, the third and the fourth mapping, manufacturing at least one second panel based on the manufacturing template and assembling the piece of apparel using the at least one second panel.

For instance, said embodiment enables individualized manufacturing according to customer requirements and/or preferences. In particular, the shape, look, material, placement of design elements and/or the color of the piece of apparel may be individually modified according to customer preferences without involving the production engineer in the modification of the manufacturing template.

Further, the present invention provides a data processing system or device for executing a computer program comprising instructions for implementing a method according to any of the aspects of the present invention.

DESCRIPTION OF THE FIGURES

Aspects of the present invention are described in more detail in the following by reference to the accompanying figures.

DETAILED DESCRIPTION

In the following, exemplary embodiments of the present invention of a method for designing a piece of apparel are described in more detail, with reference to an exemplary product development process for a shoe upper such as for an athletic shoe. For reasons of clarity, the description is focused on the design process for a shoe upper of such shoe. Details of the design of the sole and/or other components of the shoe are omitted.

However, it is to be understood that the present invention is not limited to such specific embodiments, but could be applied to other types of apparel and cut-and-stitched goods, for instance gloves, upper and lower body garments, bags and backpacks, various types of shoes such as running shoes, hiking boots, soccer boots, tennis shoes, golf shoes, leisure shoes, etc.

Moreover, while specific feature combinations are described in the following with respect to the exemplary embodiments of the present invention, it is to be understood that the disclosure is not limited to such embodiments. In other words, not all features have to be present for realizing the invention, and the embodiments may be modified by combining certain features of one embodiment with one or more features of another embodiment.

Some embodiments comprise a plurality of related method steps. For reason of clarity these steps are in some cases illustrated as being performed one after the other. However, it is to be understood that some of these method steps may be performed simultaneously and/or in any order as appreciable by the person skilled in the art.

FIG. 1 shows a conventional product development process commonly used in the apparel and shoe industry. The details are described above in the "Technical Background."

Figure 2A:
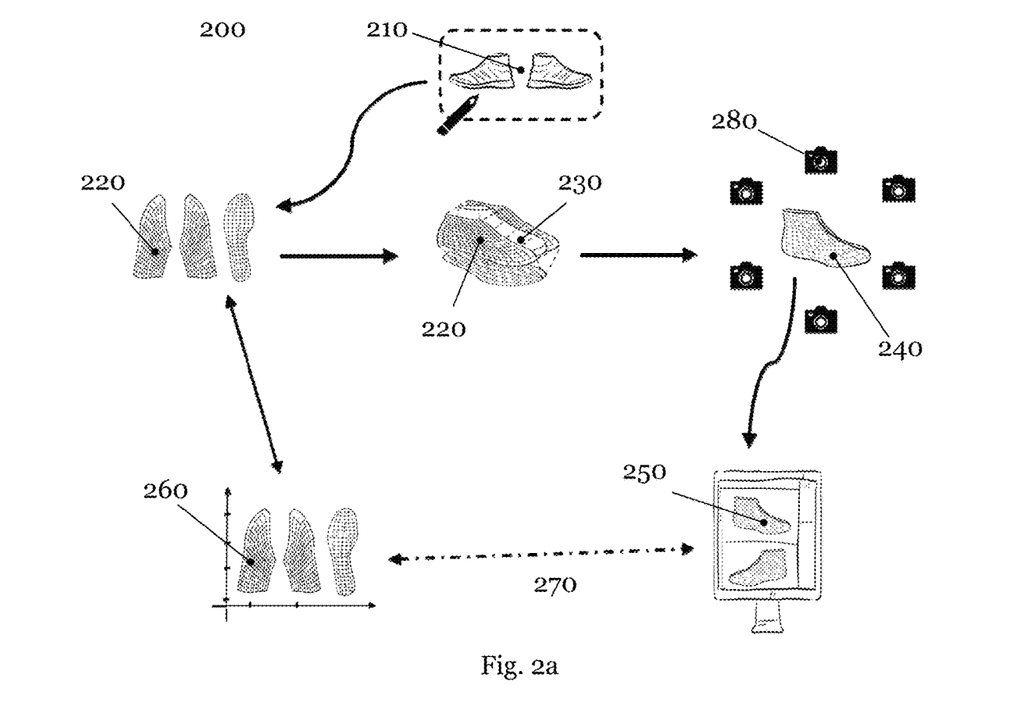
FIG. 2a illustrates a design process according to an embodiment of the present invention.

FIG. 2a shows a design process 200 for a shoe upper, such as an upper for an athletic shoe, according to an embodiment of the present invention. The exemplary process starts with generating a concept design 210 of a new shoe. At this stage a reference shoe last 230 is also chosen for designing the shoe and in particular the shoe upper. The reference shoe last 230 is characterized by and chosen based on a specific shoe size and shape.

A plurality of panels 220 are then manufactured. These panels 220 may comprise a first material and may be joined together along their edges to form a dummy shoe upper 240—also called last shell in the field. As shown in FIG. 2a, the panels 220 and the last shell 240 may correspond and fit to the outer surfaces of a given reference shoe last 230, and thus reflect the size and shape of the reference shoe last 230. The panels 220 and the last shell 240 may be made of suitable materials used by the skilled person in the field, for example, leather, synthetics, a mesh material, a knit material, etc. More details of the last shell 240 are described below.

According to the present invention, each of the panels 220 is provided with a plurality of feature points thereon. The feature points are configured to allow a unique identification of the position of each feature point with respect to one or more of all other feature points, a common reference point and/or a coordinate system.

In some embodiments, the feature points may be arranged on the surface of the panels 220 in a regular pattern and may be configured to exhibit a positional coding scheme such as a unique color code. The positional coding scheme allows to uniquely identify the position of a given feature point with respect to all other feature points on the surface of the panels 220, for example by considering the given feature point or a subset of feature points near the given feature point. In other words, each of the feature points is surrounded by a specific color scheme or matrix. By recording and recognizing the specific color scheme or matrix, the relative positions of the feature points can be identified. The relative position of the feature points on the panels 220 may also be encoded by numbering, a bar code, a shape code or any other code suitable to convey information on the relative position of a given feature point with respect to all other feature points and/or a common coordinate system that is associated with the panels 220 and the last shell 240.

Associated with the panels 220, a 2D reference model 260 such as a 2D CAD model of the panels 220 can be obtained. The 2D CAD model 260 comprises an accurate representation of the plurality of feature points of the panels 220. In other words, there exists a one-to-one correspondence between the panels 220 and the 2D CAD model 260 of the panels.

In some embodiments, the 2D CAD model 260 may be generated before the panels 220 are manufactured. In particular, the panels may be manufactured based on the 2D CAD model 260. For example, the 2D CAD model 260 may serve as a manufacturing template for the panels 220 used in the design process 200.

Alternatively, the 2D CAD model 260 may be obtained after the panels have been manufactured, for example, by a 2D scanning technique such as flat bed scanning, photography, etc.

In both cases, the 2D CAD model 260 of the panels 220 reflects the shape and size of the reference shoe last 230 used during the design process 200 and/or includes the plurality of feature points.

To form the last shell 240, the panels 220 may be joined together. The last shell 240 is then arranged on at least a portion of the surface of a reference shoe last 230. The panels 220 may be joined along some of their edges via conventional joining techniques such as gluing, welding, stitching, etc. Alternatively, it may also be possible to produce the last shell 240 from a single panel 220. In this case the step of joining the panels 220 to form the last shell 240 may be omitted.

When arranging the last shell 240 on the surface of the reference shoe last 230, the panels 220 are no longer present in an essentially 2D configuration but are transformed into a 3D configuration. In particular, forming the last shell 240 from the panels 220 may deform the original shape of the panels 220. Moreover, arranging the last shell 240 on the surface of the reference shoe last 230 may cause deformation such as stretching or shear deformation of the panels 220.

The deformation of the original panels 220 may be mathematically described by a smooth and bijective transformation function $f$, where $f$ uniquely maps each point x on the surface of the panels 220 in the 2D configuration to a correspondingly transformed point x' on the surface of the panels 220 in the 3D configuration. Accordingly, the formation of the last shell 240 and the arrangement of the last shell 240 on the surface of the reference shoe last 230 may be described by a function $f$ that maps a surface in 2D space (i.e., the panels 220) to a deformed surface in 3D space (i.e., the surface of the last shell 240 being arranged on the reference shoe last 230).

Depending on factors like the material properties of the panels 220, the degree of deformation and the employed joining techniques, it may be very hard to determine the transformation function $f$ analytically or even numerically by computer simulation tools. The present invention provides easy and efficient approaches for determining the transformation function $f$, which are described in more detail below.

As shown in FIG. 2a, subsequent to the arrangement of the last shell 240 on the surface of the reference shoe last 230, a 3D scanning apparatus 280 is used to generate a 3D reference model 250 such as a 3D CAD model of the last shell 240 arranged in the 3D configuration. This is accomplished by a 3D scanning apparatus 280 identifying the plurality of feature points on the surface of the last shell 240 and reading out any positional code the feature points may be configured with. The 3D scanning apparatus 280 may be based on photogrammetry, 3D laser scanning or other suitable techniques used for 3D reconstruction of physical objects.

As mentioned above, the panels 220 forming the last shell 240 may be deformed during arranging the last shell 240 on the surface of the reference shoe last 230. Accordingly, the relative distances and relative angles among the feature points on the surface of the las shell 240 are transformed. For example, the surfaces of the panels 220 forming the last shell 240 are no longer flat but may exhibit a significant curvature.

In the case where the feature points on the surface of the last shell 240 are configured with a unique position code, the 3D scanning apparatus 280 alone or in combination with dedicated software tools can uniquely identify the position of each feature point of the panels 220 in the 3D configuration (i.e., on the surface of the reference shoe last 230) with the corresponding position of the respective feature point in the 2D configuration. In this way the transformation function $f$ may be determined for any given combination of reference shoe last 230 and material used for manufacturing the panels 220.

If the feature points are not configured with a unique position code, the identification of the feature points in the 3D configuration with the feature points in the 2D configuration may also be performed using the regular arrangement or pattern of the feature points on the surface of the panels 220. The position of a single feature point may be first identified as a reference feature point. The locations of at least a subset of the remaining feature points can then be determined with respect to the reference feature point by using the regular arrangement or pattern of the feature points.

In some embodiments, the 3D scanning apparatus 280 and the method performed therein may identify only a subset of the plurality of feature points on the surface of the last shell 240. In this case the function $f$ may be determined based on the subset of identified feature points via conventional interpolation methods such as linear interpolation, spline interpolation, etc. Similar methods may also be used to ensure that the 3D CAD model 250 of the shoe may be inspected or modified on a significantly smaller scale or with significantly higher resolution than the scale and resolution given by the distances between the feature points on the surface of the last shell 240.

In some embodiments, especially when the 3D scanning apparatus may identify only a subset of feature points, numerical extrapolation and/or interpolation techniques may allow to simulate additional sections to the panels 220 and add further feature points which have not been identified by the 3D scanning apparatus 280.

By performing at least some of the steps of the above discussed embodiments of the invention, i.e., the identification of the feature points on the surface of the last shell 240 by one of the above-mentioned methods, a 3D CAD model 250 of the last shell 240 can be generated.

The last shell 240 may also be considered as a template for a shoe upper with respect to the chosen reference shoe last 230. The 3D CAD model 250 therefore may correspondingly be considered as a 3D CAD model for a shoe upper for a given reference shoe last 230.

With the 2D CAD model 260, the 3D CAD model 250 and the feature points at hand, it is then possible to establish an accurate one-to-one (mathematically also called bijective) mapping 270 between the 2D CAD model 260 of the panels 220 and the surface of the 3D CAD model 250 of the last shell 240 for a given reference shoe last 230 for given material properties exhibited by the panels 220.

The bijective mapping 270 enables the shoe designer or any other person involved in the product design or product development process to work with the 2D CAD model 260, the 3D CAD model 250, or both. With the bijective mapping 270 available, all modifications made to one of the CAD models 250 and 260 can then be transformed and visualized form 2D to 3D and vice versa, without additional effort for the designer. For example, the designer may attach certain design elements (e.g., logos, stripes, holes, letters, etc.) to the 2D CAD model and these design elements would be visualized on the 3D CAD model 250 and vice versa in a very short time or immediately.

Figure 2B:
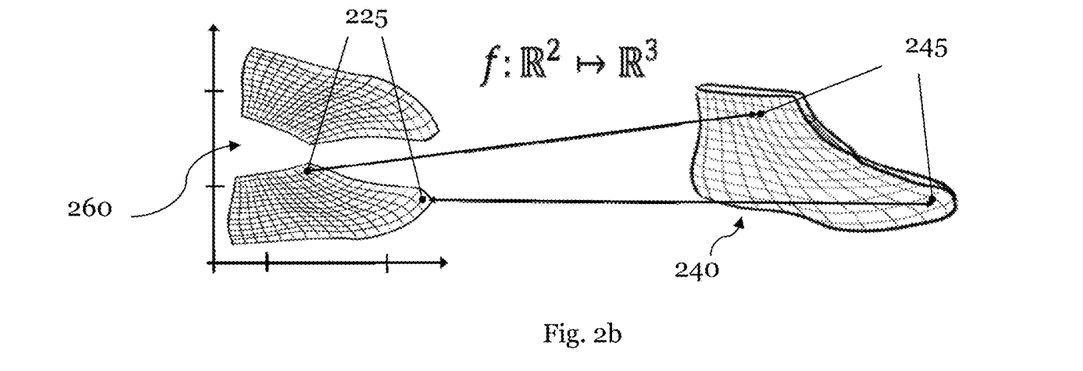
FIG. 2b illustrates a first mapping between a first panel in a 2D configuration and the first panel in a 3D configuration.

FIG. 2b illustrates in further detail how the embodiment described in FIG. 2a above establishes an accurate mapping 270 between the 2D CAD model 260 of the panels 220 and the reconstructed last shell 240 that has been scanned by the scanning apparatus 280.

The 3D scanning apparatus 280 allows to identify feature points 225 arranged on the surface of the panels 220 with the corresponding feature points 245 on the surface of the reconstructed last shell 240. Moreover, the reconstruction of the last shell 240 generated by the 3D scanning apparatus 280 is true to scale. Since the 2D CAD model 260 of the panels 220 is also true to scale, the present invention allows to establish a bijective and true to scale transformation function $f$ from the 2D CAD model 260 to the 3D last shell 240 and thereby to the 3D CAD model 250 of the last shell 240. The function $f$ is mathematically considered as a smooth and bijective function from a subset of 2D space (i.e., $R^2$) to a subset (i.e., a curved 2D submanifold) of 3D space (i.e., $R^3$).

In other embodiments of the present invention, the bijective function $f$ may alternatively be determined by numerical methods. For instance, the arrangement of the panels 220 on the reference shoe last 230 may be performed using the 2D CAD model 260 of the panels 220. This can be achieved by methods such as FEM simulation or any other numerical tool such as VStitcher, clo3D, optitex or similar that is adapted to simulate the assembly and the deformation of the panels 220 when being arranged on a virtual reference shoe last 230. In this way, a corresponding 3D CAD model 250 of the shoe upper can be obtained and the manufacture of the panels 220 and a physical reference shoe last 230 may in the case be optional.

Further, the 2D CAD model 260 may comprise material characteristics and properties of the panels 220 that are relevant for simulating the deformation and/or joining of the panels 220 (e.g., density, Young's modulus, stretch, bending resistance, friction, etc.).

For example, the 2D CAD model 260 of the panels 220 may comprises a thickness parameter which represents the thickness of the panels 220 and which could be used as a control parameter when making simulations. For example, it might be set as unallowable to locally change the thickness of the panels 220 while simulating the deformation of the panels 220 based on the 2D CAD model 260.

In some embodiments, the panels 220 may also be implemented as a true 3D CAD model. In this case, it may be possible to simulate the local change of the thickness of the panels 220 caused by deformations of the panels 220 based on the 2D CAD model 260.

Figure 3:
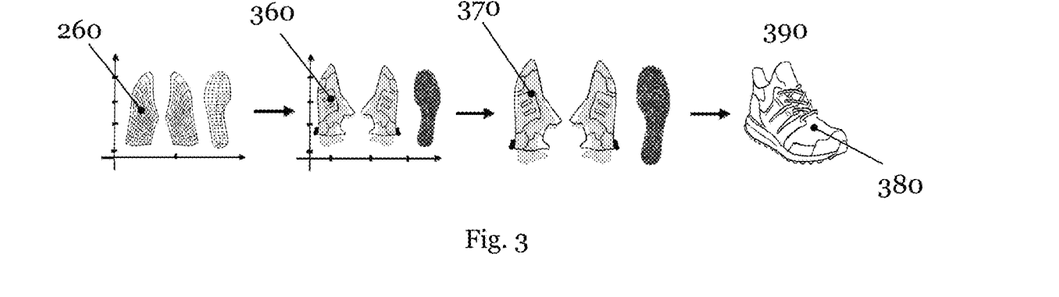
FIG. 3 illustrates a product engineering process according to an embodiment of the present invention.

FIG. 3 illustrates a production engineering process for a shoe prototype 390 comprising a shoe upper prototype 380 according to an embodiment of the present invention. The production engineering process may be a part of a product development process for the shoe prototype 390. Further, the production engineering process may be combined with the design process 200 as illustrated in FIGS. 2a and 2b to become a complete and smooth design-to-manufacture product development process for the shoe prototype 390.

Provided that the shoe upper prototype 380 is based on and refers to the given reference shoe last 230 and the corresponding design concept 210 (shown in FIG. 2a), there is a need for a corresponding manufacturing template 360 in order to manufacture the shoe upper prototype 380 for the shoe prototype 390. This manufacturing template 360 may contain and reflect at least the materials and the properties thereof that would be used to manufacture the shoe upper prototype 380.

With this manufacturing template 360, a plurality of manufacturing panels 370 are produced first, followed by assembling these panels 370 into a shoe upper prototype 380, which is then used to make the shoe prototype 390. The manufacturing template 360 for the shoe upper 380 may include information such as material properties, requirements of manufacturing methods or processes, constraints or limitations of manufacture tools or machines, etc., in order to produce the wished manufacturing panels 370 and provide a smooth and easy assembly to make the shoe upper prototype 380.

Corresponding to the panels 220 and the 2D CAD model 260 of the panels that are used in the design process, the manufacturing template 360 and the manufacturing panels 370 are crucial in the product engineering process to transfer the design concept 210 into the product (i.e., the shoe upper prototype 380). For example, due to manufacturing constraints, the shape and size of the manufacturing panels 370 may not be identical to the shape and size of the design panels 220. Also, the design elements on the panels 370 and their locations with respect to the whole panels 370 might be different and changed comparing to the design elements and locations on the 2D CAD model 260.

Conventionally, the manufacturing template 360 is generated by a specialized production engineer based on information provided by the product designer with some help of such as the 2D CAD model 260 and/or the 3D CAD model 250, wherein the template 360 normally incorporates a significant amount of manufacturing know-how and may involve iterating experimentation, material adaptation processes, etc. This conventional trial-and-error process is cost- and time-consuming, and the acquired manufacturing panels 370 and prototype shoe upper 380 could normally not represent the initial design concept 210 precisely.

Therefore, the present invention provides a one-to-one mapping between the manufacturing template 360 and the 2D CAD model 260 of the panels 220, so that the design concept can be transferred precisely to the product prototype via this one-to-one mapping.

Figure 4:
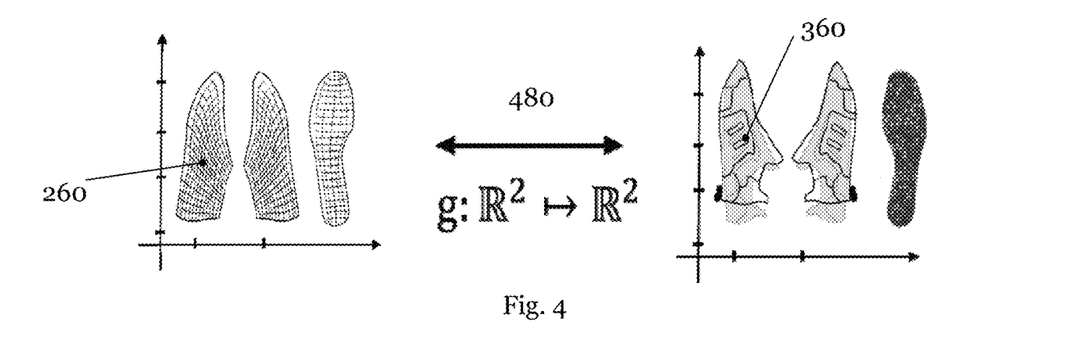
FIG. 4 illustrates a second mapping between a 2D reference model of a first panel and a manufacturing template according to an embodiment of the present invention.

FIG. 4 illustrates how a one-to-one mapping 480 between the 2D CAD model 260 of the panels 220 and the manufacturing template 360 for the manufacturing panels 370 can be obtained.

In particular, a transformation function g can be numerically determined such that g (bijectively) maps the 2D CAD model 260 to the manufacturing template 360. For example, the function g may be obtained by a numerical deformation algorithm that involves a FEM tool, deformation of a polygon mesh, or other numerical methods known in the art that allow to transform virtual 2D objects into each other.

For instance, the one-to-one mapping 480 can be obtained via a simulation tool such as V-Stitcher, clo3D, optitex, etc., and any suitable FEM simulation tools known in the art.

Figure 5:
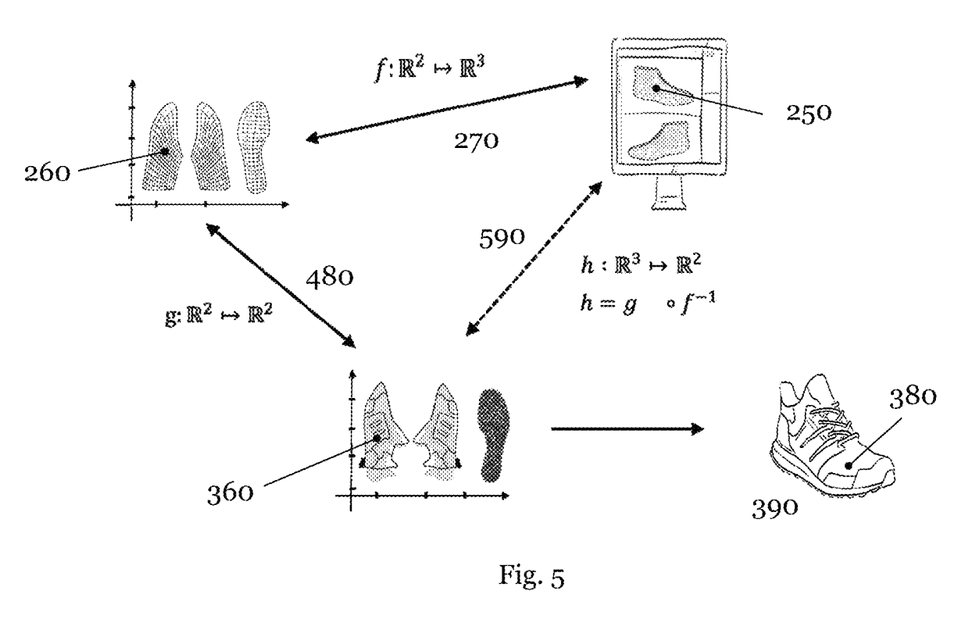
FIG. 5 illustrates the relationship between the first and the second mappings and their relevance in a product development process according to an embodiment of the present invention.

FIG. 5 illustrates the relations among the 3D CAD model 250, the 2D CAD model 260 of the panels 220 used for the design concept and the manufacturing template 360 used for producing the manufacturing panels 370 and the shoe upper prototype 380.

The method illustrated in FIG. 2a allows to obtain the one-to-one mapping 270 (i.e., the bijective transformation function $f$), which allows for translating any modification made to the 3D CAD model 250 to the 2D CAD model 260 and vice versa.

Similarly, the one-to-one mapping 480 (i.e., the transformation function g) obtained, for example, by a numerical transformation method (see FIG. 4) allows to translate any modification made to the manufacturing template 360 to the 2D CAD model 260 and vice versa.

By combining the mapping 270 (i.e., function $f$) with the mapping 480 (i.e., function g), the present invention allows for translating modifications made to the 3D CAD model 250 (used in the design process) directly to the manufacturing template 360 (used in the product engineering process) and vice versa.

As mentioned above, it may be hard to directly determine a one-to-one mapping (i.e., a function h) that maps the 3D CAD model 250 to manufacturing template 360, in particular due to various manufacturing requirements that need to be met by the manufacturing template 360. The present invention and the provided method thus allow to obtain the desired one-to-one mapping 590 (i.e., the function h) by combining the inverse function of the function $f$ (named as $f^{-1}$) with the function g.

The combined mapping 590 (i.e., the function h) allows to uniquely map every feature point on the surface of the 3D CAD model 250 of the last shell to every feature point on the surface of the manufacturing template 360, which is used for manufacturing the shoe upper prototype 380 and the shoe prototype 390. Thus, modifications made to the 3D CAD model 250 can be directly translated to the manufacturing template 360 and vice versa.

In this way, any changes of a design concept, either because of manufacturing requirements or because of updated design decisions, can be implemented and visualized at the same time at the design level (i.e., by the design entity) as well as at the manufacturing level (i.e., by the manufacturing entity).

Figure 6:
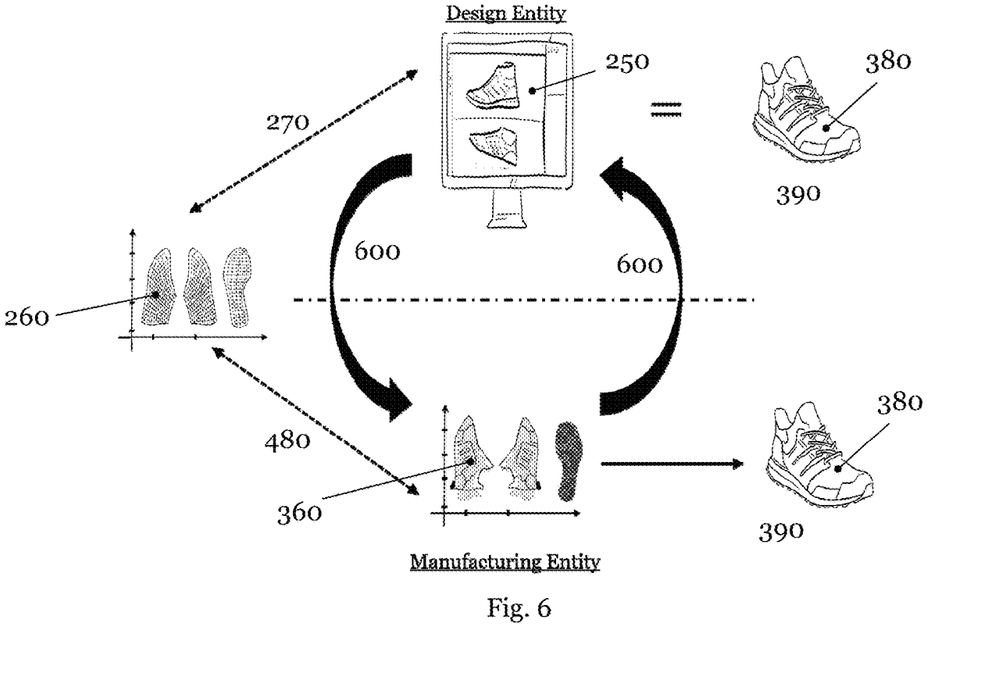
FIG. 6 illustrates an improved product design and development process according to an embodiment of the present invention.

FIG. 6 illustrates an improved product development process enabled by the present invention. The present invention provides a one-to-one mapping 270 between a 3D CAD model 250 of a last shell in a 3D configuration (true to scale) and a 2D CAD model 260 of the panels 220 of the last shell in a 2D configuration as well as a one-to-one mapping 480 between the 2D CAD model 260 and a manufacturing template 360 for manufacturing panels 370 used on manufacturing of the shoe upper prototype 380 and the shoe prototype 390.

Based on these two mappings 270, 480, design changes can be easily implemented back and forth 600 between a product design entity and a manufacturing entity without the need to involve a specialized product engineer to implement every design change on the level of the 2D CAD manufacturing template 360. Accordingly, product design and production engineering may be iterated 600 via software without the need to manufacture intermediate physical prototypes. In other words, feedback between the manufacturing entity and the design entity no longer exclusively relies on inspecting physical prototypes 380 but may be done via CAD software. The actually produced shoe upper prototype 380 can then directly satisfy and reflect the combined requirements of the design entity and of the manufacturing entity.

Moreover, the 3D CAD model 250 used for product design may accurately incorporate the relevant material properties and manufacturing requirements that have been considered by the manufacturing entity for generating the manufacturing template 360 which is used for the manufacture of the shoe upper prototype 380.

Figure 7:
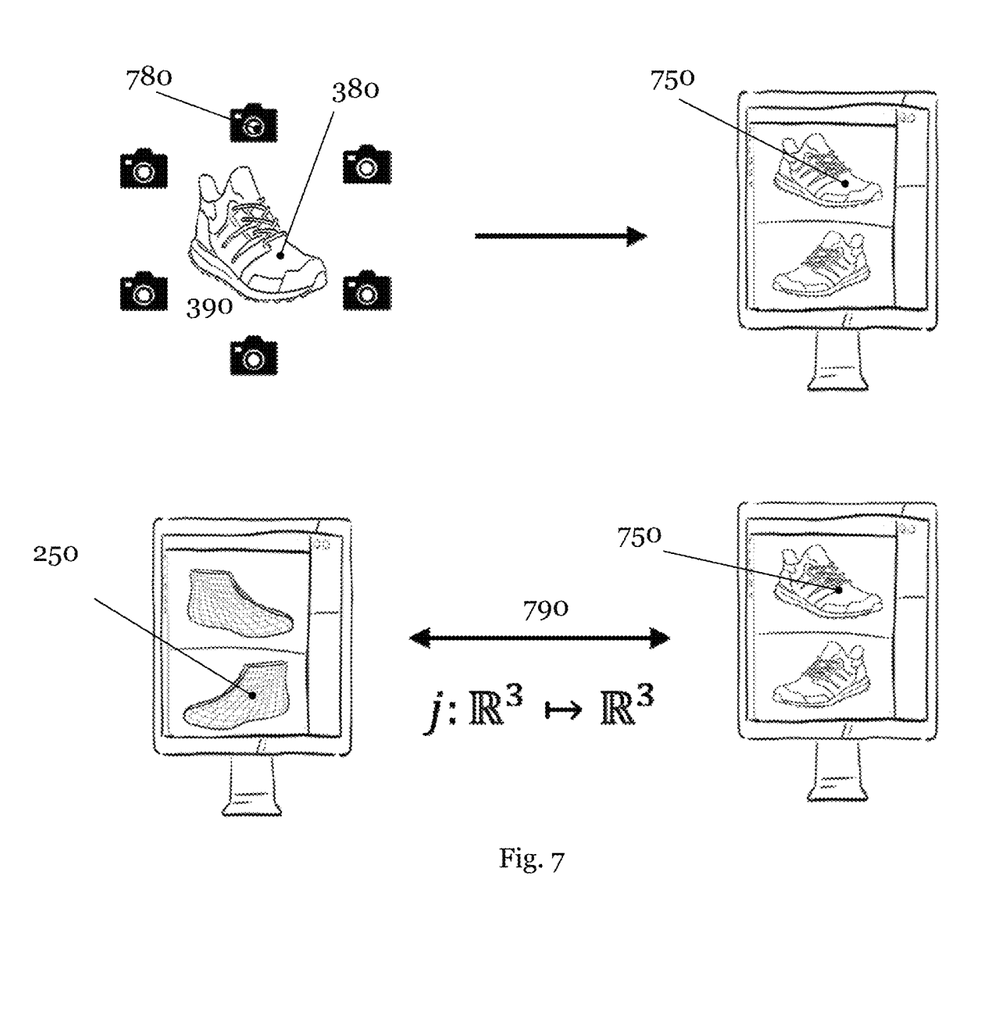
FIG. 7 illustrates a supplementary method further improving the methods provided by the present invention.

FIG. 7 illustrates an alternative or supplementary approach to the above methods provided by the present invention. In addition to obtaining the one-to-one mapping 590 between the 3D CAD model 250 and the manufacturing template 360, it is also possible to obtain a one-to-one mapping 790 between the 3D CAD model 250 and a 3D CAD model 750 of the actual shoe upper prototype 380.

The 3D CAD model 750 of the shoe upper prototype 380 and/or the shoe prototype 390 may be obtained by a 3D scanning apparatus 780 operated at the manufacturing entity. For instance, the 3D scanning apparatus 780 may be of the same type as the 3D scanning apparatus 280 described above. Further, the 3D CAD model 750 of the shoe upper prototype 380 may incorporate the effects of arranging the shoe upper prototype 380 on the same reference shoe 230 last as used by the design entity.

The mapping 790 (i.e., the transformation function j as shown in FIG. 7) may be determined by similar methods as described above with reference to FIG. 4 (e.g., by an FEM based deformation algorithm).

In this way both the deformation (e.g., stretch, shear, joining effects, etc.) of the design panels 220 used during the design process and the deformation of the manufacturing panels 370 used for assembly of the shoe upper prototype 380 can be incorporated into the improved product development process illustrated in FIG. 6 and above.

This embodiment may be particularly relevant for situations where the material properties of the design panels 220 and the material properties of the manufacturing panels 370 are significantly different and hard to simulate. Further, the adaptation of an existing shoe design to various different manufacturing materials and/or processes is simplified.

The invention claimed is:

1. A method for designing apparel, the method comprising:
   arranging feature points in a first configuration on a surface of a panel;
   generating a two-dimensional reference model based on the first configuration;
   arranging the panel on a first reference body in a second configuration after generating the two-dimensional reference model, the second configuration representing the apparel;
   generating a three-dimensional reference model based on the second configuration, the three-dimensional reference model including the feature points arranged on the surface;
   generating a mapping between the first configuration of the panel and the second configuration of the panel using the feature points molded in both the two-dimensional reference model and the three-dimensional reference model;
   designing the apparel based on the mapping.

2. The method of claim 1, wherein the first configuration is a two-dimensional configuration and the second configuration is a three-dimensional configuration.

3. The method of claim 1, wherein the two-dimensional reference model includes the feature points arranged on the surface.

4. The method of claim 3, wherein each feature point comprises a unique identification of position.

5. The method of claim 1, wherein the apparel is an upper of a shoe.

6. The method of claim 1, further comprising generating a manufacturing template for the apparel.

7. The method of claim 6, further comprising generating a second mapping between the manufacturing template and the two-dimensional reference model.

8. The method of claim 7, further comprising generating a third mapping between the manufacturing template and the three-dimensional reference model.

9. The method of claim 1, wherein the arranging the panel on the first reference body comprises fitting the panel to the surface of the first reference body such that the panel reflects both the size and shape of the first reference body.

10. The method of claim 1, wherein the panel is a physical panel.

11. A method of manufacturing a shoe upper, the method comprising:
    preparing reference models of panels, the preparing reference models comprising:
      arranging feature points on a first surface of a first panel to generate a first two-dimensional reference model,
      arranging feature points on a second surface of a second panel to generate a second two-dimensional reference model;
    generating manufacturing templates of the panels, the generating manufacturing templates comprising:
      mapping the first two-dimensional reference model to a first three-dimensional reference model of the first panel to prepare a first manufacturing template of the first panel, wherein the first three-dimensional reference model is a shoe last, and
      mapping the second two-dimensional reference model to a second three-dimensional reference model of the first panel to prepare a second manufacturing template of the second panel;
    manufacturing the first panel based on the first manufacturing template;
    manufacturing the second panel based on the second manufacturing template;
    joining the first panel and the second panel to form the shoe upper.

12. The system of claim 11, further comprising deforming the first panel.

13. The system of claim 12, wherein the joining the first panel and the second panel comprises joining a first edge of the first panel with a second edge of the second panel.

14. The system of claim 11, wherein the manufacturing template is an editable computer aided design model.

15. The method of claim 11, wherein each feature point defines a unique identification of position.

16. The method of claim 11, wherein the mapping the first two-dimensional reference model involves a three-dimensional scanning technique.

17. The method according to claim 11, further comprising iteratively designing the shoe upper based on the mapping the first two-dimensional reference model or the mapping the second two-dimensional reference model.

18. The method of claim 11, wherein the shoe last is a virtual shoe last.

19. A system for manufacturing a shoe upper, the system comprising:
    a processor; and
    a memory,
    wherein the processor is configured to:
      prepare reference models of panels by arranging feature points on a first surface of a first panel to generate a first two-dimensional reference model, and arranging feature points on a second surface of a second panel to generate a second two-dimensional reference model; and
      generate, after preparing the reference models, three-dimensional models of the panels by mapping the first two-dimensional reference model to a first three-dimensional reference model of the first panel to prepare a first manufacturing template of the first panel and mapping the second two-dimensional reference model to a second three-dimensional reference model of the second panel to prepare a second manufacturing template of the second panel, wherein the first three-dimensional reference model is a shoe last; and
      design the shoe upper based on the first manufacturing template and the second manufacturing template.

20. The system of claim 19, wherein the mapping the first two-dimensional reference model involves a three-dimensional scanning technique.

21. The system of claim 19, wherein feature points are configured to allow a unique identification of the position of each feature point.

22. The system of claim 19, wherein the processor is further configured to iteratively design the shoe upper based.

23. The method of claim 19, wherein the shoe last is a virtual shoe last.

* * * * *